United States Patent [19]
Hellmich

[11] Patent Number: 5,996,548
[45] Date of Patent: *Dec. 7, 1999

[54] METHOD OF OPERATING AN INTERNAL COMBUSTION ENGINE

[75] Inventor: Wolfram Hellmich, Munich, Germany

[73] Assignee: Ficht GmbH & Co. KG, Germany

[*] Notice: This patent is subject to a terminal disclaimer.

[21] Appl. No.: 09/250,589

[22] Filed: Feb. 16, 1999

Related U.S. Application Data

[63] Continuation of application No. 08/819,947, Mar. 18, 1997.

[30]     Foreign Application Priority Data

Oct. 30, 1996 [DE] Germany .......................... 196 43 886

[51] Int. Cl.$^6$ ..................................................... F02B 17/00
[52] U.S. Cl. .......................... 123/295; 123/298; 123/305; 123/661
[58] Field of Search ..................................... 123/276, 279, 123/295, 298, 299, 305, 661, 73 C

[56]           References Cited

U.S. PATENT DOCUMENTS

| | | | |
|---|---|---|---|
| 3,094,974 | 6/1963 | Barber | 123/260 X |
| 4,216,745 | 8/1980 | Latter et al. | 123/299 X |
| 4,286,557 | 9/1981 | Klomp | 123/295 X |
| 4,770,138 | 9/1988 | Onishi | 123/276 |
| 4,920,937 | 5/1990 | Sasaki et al. | 123/276 X |
| 5,127,379 | 7/1992 | Kobayashi et al. | 123/276 X |
| 5,140,958 | 8/1992 | Kobayashi et al. | 123/276 |
| 5,209,200 | 5/1993 | Ahern et al. | 123/276 |
| 5,259,348 | 11/1993 | Kobayashi et al. | 123/276 X |
| 5,271,362 | 12/1993 | Kobayashi et al. | 123/299 |

*Primary Examiner*—Tony M. Argenbright
*Attorney, Agent, or Firm*—Jones & Askew

[57]           ABSTRACT

The invention relates to a method of operating an internal combustion engine and to an internal combustion engine respectively. In accordance with the method of operating an internal combustion engine in accordance with the invention fuel is injected into a combustion chamber so that it is reflected by a piston, as a result of which charge stratification occurs in the combustion chamber. Fresh air is inducted slightly throttled or not throttled at all into the combustion chamber irrespective of the loading condition of the internal combustion engine so that the exhaust gases from the previous working stroke are completely swept from the combustion chamber. The output of the internal combustion engine is generated substantially via the injected amount of fuel. Due to the method in accordance with the invention charge stratification is caused in which burning of the fuel/air mixture is ideal. The internal combustion engine in accordance with the invention thus features smooth running for ideal emission values.

30 Claims, 3 Drawing Sheets

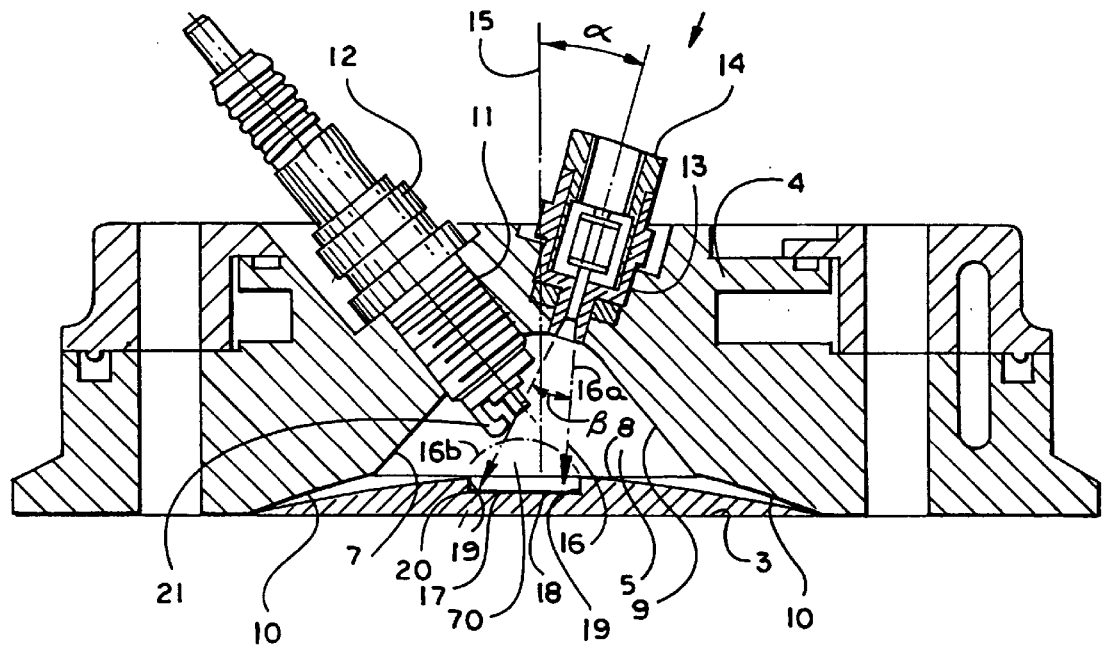
Fig_1
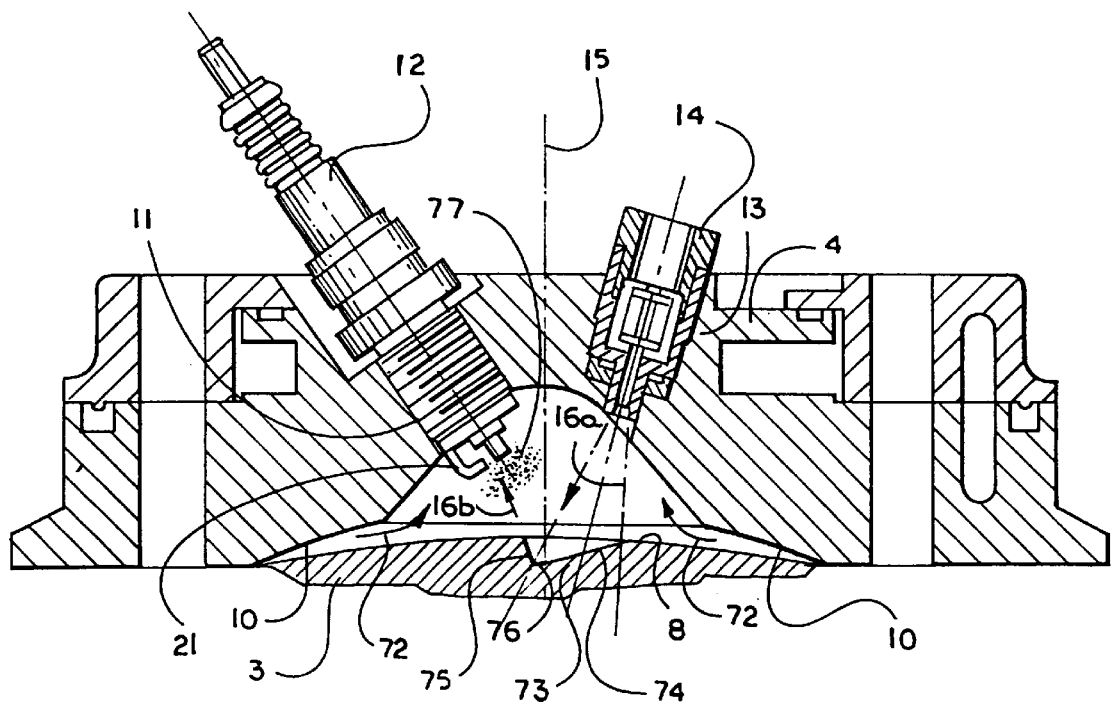
Fig_2

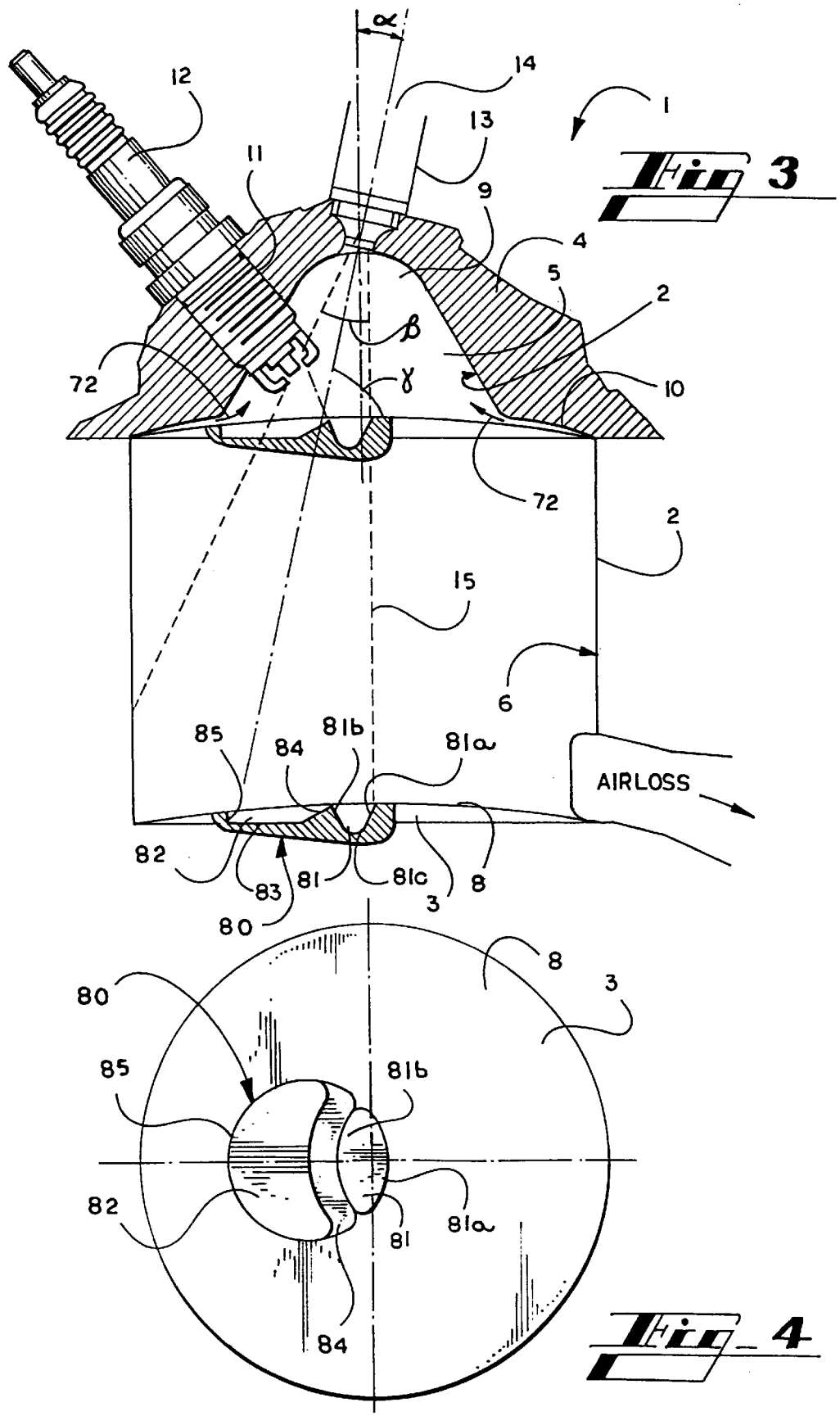

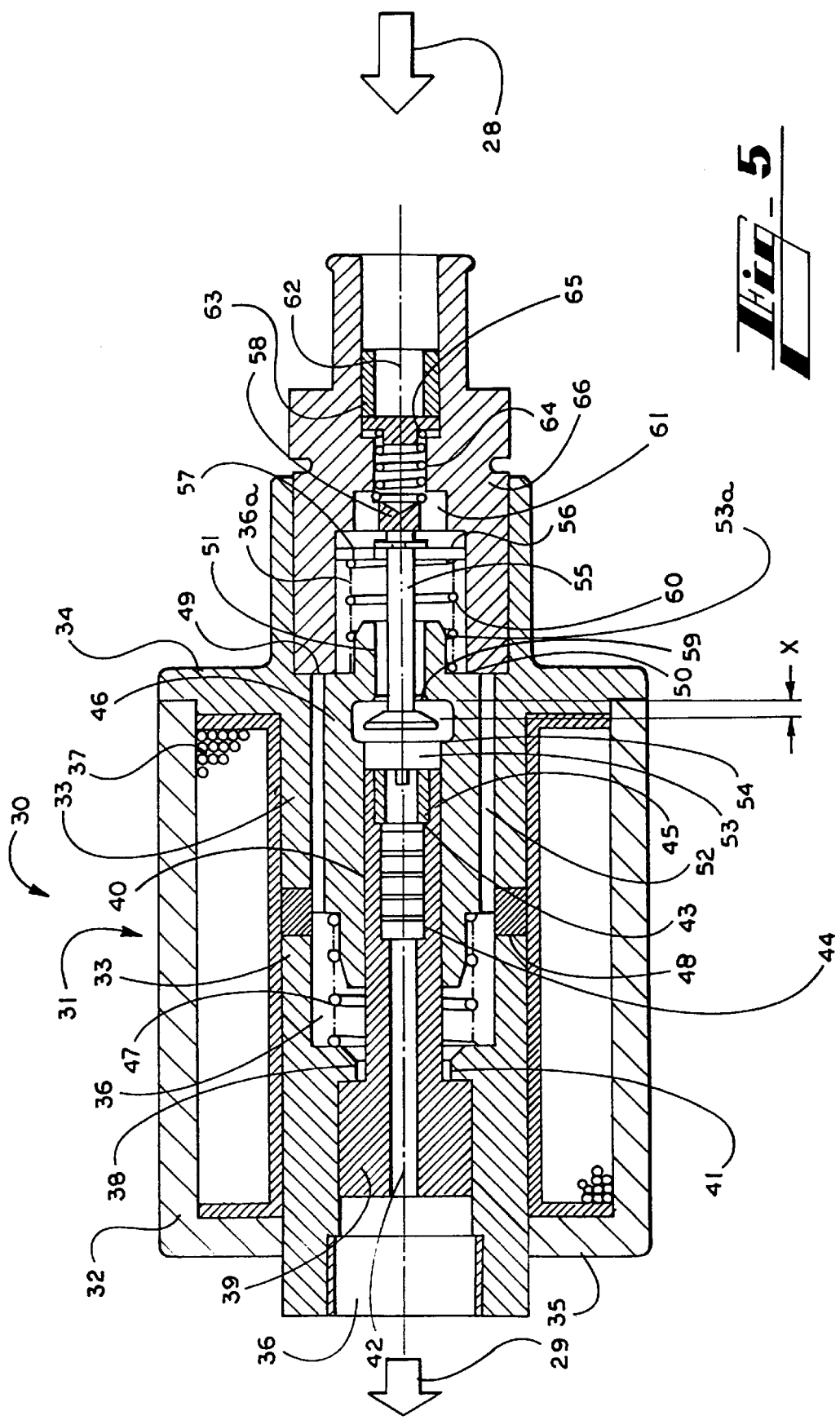

METHOD OF OPERATING AN INTERNAL COMBUSTION ENGINE

CROSS-REFERENCE TO RELATED APPLICATION

This application is a continuation of application Ser. No. 08/819,947 filed Mar. 18, 1997.

The invention relates to a method of operating an internal combustion engine.

One such internal combustion engine is known from European Patent 0 463 613 A1. By means known as such, this internal combustion engine comprises a combustion chamber defined by a cylinder, a piston reciprocating in said cylinder and a cylinder head. In the cylinder head at least one intake valve and one exhaust valve is arranged. Porting into the combustion chamber at the edge portion of the cylinder head directly juxtaposed to the injection valve is an injector nozzle capable of injecting fuel into the combustion chamber at a shallow angle. In its middle portion the cylinder head is elongated downwards into the combustion chamber. In this middle portion a spark plug is vertically secured, it protruding into the combustion chamber by its ignition electrodes.

At top dead center (TDC) the piston is at its maximum top position and is directly arranged on the cylinder head by its piston crown. In the region of the spark plug the piston crown comprises a small dish-shaped recess surrounding the ignition electrodes of the spark plug at top dead center of the piston. In the region below the intake duct a dish-shaped depression is incorporated in the piston crown. This depression edtends from the injector nozzle to the recess in the piston crown, into which the ignition electrodes protrude.

When this internal combustion engine is operated at low load a small amount of fuel is injected into the bowl in the piston crown, the injected fuel being directed along the spherical bottom of the bowl into the region of the recess or spark plugs. A relatively strongly enriched ignitable mixture thus collects in the region of the spark plug.

At a higher load a first amount of fuel is injected shortly after the piston has reached bottom dead center BDC. The first amount of fuel is mixed with the inducted air to form a lean fuel/air mixture. A second amount of fuel is injected when the piston is located roughly halfway between upper and lower dead center, so that the fuel vertically impinges the depression and only a minor portion thereof collects in the recess. As a result of this the fuel/air mixture injected initially is enriched in the region of the recess to become an ignitable mixture capable of being ignited by the spark plug.

This internal combustion engine thus operates at high load in accordance with the so-called principle of charge stratification once differingly rich fuel/air mixtures have formed in differing regions in the combustion chamber, the region about the intake duct being richer and thus more ignitable than the remaining regions. Charge stratification by dual injection thus serves above all to operate lean engines.

From German Patent 41 10 618 an internal combustion engine is known having a fuel-injection control system which generates a charge stratification by two-stage fuel injection in a medium load range. A first amount of fuel is injected in advance and mixes with the inducted air to form a lean fuel/air mixture. A second amount of fuel is injected into the region of the spark plug shortly before the ignition point and ignited. The second amount of fuel serves to assist igniting the lean fuel/air mixture. At higher loads this internal combustion engine is operated with an homogenous charge stratification.

Operating internal combustion engines, more particularly two-stroke internal combustion engines, with charge stratification has hitherto failed to become popular since the injection method is highly complicated and, in addition to this, no satisfactory running properties could be achieved in the transition from operating with charge stratification to operating with an homogenous preparation of the mixture.

The invention is based on the object of achieving a simple method of operating an internal combustion engine by means of charge stratification which is more particularly suitable for two-stroke internal combustion engines. The invention is further based on the object of defining an internal combustion engine in which charge stratification can be effectively introduced by simple ways and means and which features very good running properties for both minimum and medium engine loads.

In the case of the method in accordance with the invention a jet of fuel is injected by an injector nozzle into a combustion chamber oriented at a steep angle relative to a piston crown, whereby in the region of the piston crown on which the jet of fuel impinges a bowl is configured so that the fuel is reflected back into the combustion chamber. This reflection of the fuel creates in the combustion chamber a region having a predetermined fuel/air ratio. The fuel/air ratio in this region differs from that of the remaining region of the combustion chamber by the fuel being introduced directly by the jet of fuel, as a result of which a specific inhomogenous charge distribution is achieved with but a single jet of fuel and thus a desired charge stratification, i.e. no complicated dual injection being necessary.

This stratified charge burns ideally under all load conditions since fresh air is always inducted unthrottled so that all exhaust gases of the previous working stroke are swept from the combustion chamber and the latter is always filled with fresh air.

The invention will now be explained in more detail by way of example with reference to the drawings in which:

FIG. 1 is a vertical section through a combustion chamber of an internal combustion engine, FIG. 2 is a vertical section through a combustion chamber of a second example embodiment of an internal combustion engine, FIG. 3 is a vertical section through a combustion chamber of a third example embodiment of an internal combustion engine, FIG. 4 is a plan view of a piston used in the example embodiment shown in FIG. 3, FIG. 5 is a longitudinal section of an injection pump.

The method in accordance with the invention is applied to an internal combustion engine 1 comprising by known ways and means a cylinder 2 in which a piston 3 is movably arranged. The cylinder 2 is closed off at the top by a cylinder head 4. A combustion chamber 5 is defined by an inner surface area 6 of the cylinder 2, an inner surface area 7 of the cylinder head 4 and a piston crown 8 of the piston 3.

The inner surface area 7 of the cylinder head 4 comprises in the center a domed or arched recess 9 adjoining a flanked portion 10 outwardly inclined downwards at a shallow angle.

In the region of the recess 9 in the cylinder head 4 a drilled hole 11 for receiving a spark plug 12 and a drilled hole 13 for receiving an injector nozzle 14 is incorporated. The drilled hole 13 for the injector nozzle 14 is disposed roughly vertical in the cylinder head 4 or slightly deviating from a vertical axis 15 by an angle of up to 30° so that the injector nozzle 14 ejects a jet of fuel 16 against the piston crown 8 vertically with a slight inclination relative to an axis oriented perpendicular to the piston crown 8. The angle a between the axis 15 oriented perpendicular to the piston crown 8 and a longitudinal axis of the drilled hole 13 is in the range 0° to 40° and amounts preferably to approx 10° to 20°. The injector nozzle 13 is conveniently configured so that the jet of fuel 16 is ejected in the form of a cone, the angle of the cone b being approx 15° to 40°.

The piston crown 8 is arched slightly convex so that it is adapted in the edge portion to the flanked portion 10 of the cylinder head 4, it featuring in accordance with the invention a bowl 17. The bowl 17 is disposed in the center region of the piston crown 8 in which the jet of fuel 16 impinges against the piston crown 8.

In the first example embodiment (FIG. 1) the bowl 17 comprises a flat-surfaced bowl bottom 18 which is defined by a defining wall 19 oriented perpendicular to the bottom of the bowl 18. This defining wall 19 forms a sharp edge 20 with the bottom of the bowl 18

The spark plug 12 comprises ignition electrodes 21 and is disposed in the cylinder head 4 so that it protrudes by its ignition electrodes 21 into the jet of fuel 16 ejected in the form of a cone, the ignition electrodes 21 preferably being in contact with the edge portion of the fuel cone.

Use is made of a high-pressure injection means as the injection device. Preferably the injection device operates according to the energy storage principle and more particularly according to the solid-state energy storage principle. Injection devices operating according to the energy storage principle are known, for example, from the German Patents 213 472, 41 06 015 A1 and 42 06 817 C2.

In FIG. 5 an injection device operating according to the solid-state principle is illustrated, configured as a reciprocating piston pump 30 with an integrated stop valve inducting fuel on one side from a fuel tank (not shown) (arrow 28) and emitting a burst of fuel to the injector nozzle 14 on other side (arrow 29).

In a cylindrical multi-part housing 31 a coil 37 is arranged in a cavity 36 defined by an outer shell 32 and a cylinder inner shell 33 as well as by a face end wall 34 on the tank side and a face end wall 35 at the pressure port side. The cylindrical cavity 36 of the housing surrounded by the inner shell 33 is divided into a tank side and a pressure port side by a ring 38 extending radially inwards into a cavity region. On the pressure port side set against the ring edge of the ring 28 is an annular bead 39 of a piston positively seated in said cavity, the piston 40 passing through the annular opening 41 of the ring 38 spaced away from the latter and protruding into the tank side region of the cavity 36. Passing through the piston 40 is a drilled passage 42 which is configured flared in the edge portion of the piston on the tank side, where it mounts a valve 43 which is urged against a vertical section 45 by a helical spring 44 in the direction of the tank side for the closing position and which can be opened consequently by the effect of a pressure acting from the tank side.

Seated positively slidable on the portion of the piston 40 located in the interior of the cavity 36 on the tank side is a pump cylinder 46 of the reciprocating piston pump which is urged by its face end surface area on the tank side against an annular step 49 in the cavity 36 by a helical spring 47 supported at its one end by the ring 38 and at its other end by an annular step 48 of the cylinder. In this arrangement a valve port 51 protruding beyond the face ring surface area 50 protrudes partly into the cavity 36a which is radially constricted in this region and the face ring surface area of the cylinder 46 on the pressure port side is disposed spaced away from the ring 38, thus creating room for movement of the cylinder 46. The cylinder 46 seatingly guided by the inner wall of the cavity 36 comprises in the shell surface area an axial parallel arrangement of longitudinal grooves 52 open at the face end, the function of which is described further below.

Mounted on the tank side in the drilled passage 53 passing through the pump cylinder 46 throughout and receiving the piston 40 is a tappet valve arranged upstream of the piston 40, the tappet plate 54 of which is disposed spaced away from the face ring surface area of the piston 40 in a short flared portion of the drilled passage and the tappet stem 55 of which passes through the constricted drilled passage 53a in the valve port 51 supported by the inner wall of the drilled passage 53a and protrudes into the constricted cavity 36a.

Expediently secured to the free end of the tappet stem 55 is a plate 56 comprising holes 57 the function of which is described further below, the tappet stem 55 protruding partly beyond the plate 56 and coming up against the bottom surface area 58 of the cavity 36a on the tank side. In this arrangement the tappet stem 55 is selected so long that the tappet plate 56 is lifted from its valve seat, i.e. the opening 59 of the constricted drilled passage 53 on the pressure port side so that a predetermined gap "X" is formed the sense and purpose of which is explained further below. A helical spring 60 stabilizes this position of the tappet valve in the depicted resting position of the reciprocating piston pump by the spring 60 being supported at one end by the face ring surface area 50 of the cylinder 46 and at the other end by the plate 56.

Extending from the bottom surface area 58 into the bottom wall are axial-parallel drilled passages 61 which port into an axial valve space 62 in which a valve plate 65 urged by a helical spring 64 in the tank direction against a valve seat 63 is arranged, comprising grooves 66 coverable peripherally by the valve seat 63 so that the valve can be opened against the loading of the spring 64 by a pressure on the tank connection side, creating a passage from the valve space 62 to the drilled passages 61.

The valve space 62 is connected to a fuel line leading to the fuel tank (not shown); a pressure line (not shown) being applied to the face end wall 35 on the pressure port side or to an elongated port of the inner wall 33, this pressure line leading to the ejection valve. The arrows entered in FIG. 5 indicate the passage of the fuel.

The reciprocating piston pump depicted in FIG. 5 functions as follows: when the coil 37 is energized the cylinder 46 is accelerated from the depicted resting position in the direction of the pressure port with practically zero resistance, fuel flowing off from the cavity 36 via the grooves 52 and the drilled passage 52 or the tappet plate space in the direction of the cavity 36a. This accelerated movement abruptly ceases with impact of the valve seat 59 on the valve plate 54 so that the stored energy of the cylinder 46 is translated to the fuel present in the space upstream of the tappet. The valve 43 is opened and the pressure propagated to the fuel present in the drilled passage 42 or in the pressure line, as a result of which ejection of the fuel from the injector nozzle 14 occurs. If energization then still exists, fuel continues to be ejected as long as the cylinder 46 is moved, the tappet valve 54, 55 being entrained by the cylinder 46, resulting in a vacuum in the cavities 36, 36a as well as in the drilled passages 61 and the space upstream of the valve space 62 defined by the valve 65 so that the valve 65 is opened. Coming from the tank the fuel flows through the peripheral grooves 66 in the valve plate 54, the space upstream of the valve space 62, the drilled passages 61 and the holes 57 in the plate 56 into the cavity 36a as well as via the grooves 52 into the cavity 36. On energization OFF the cylinder is forced back by the spring 47 into its resting or starting position, prior to this the tappet stem 55 coming up against the bottom wall 58 and opening the tappet valve so that fuel is able to flow through the interspace between the tappet stem and the drilled passage 53a into the drilled passage or the space 53 upstream of the tappet plate, valve 43 thereby remaining closed. The latter thus acts as a standing pressure valve and maintains a standing pressure in the fuel in the space filled with fuel between the injection valve and the valve plate 54, this pressure being higher e.g. than the vapor pressure of the liquid at the maximum temperature occurring so that the formation of bubbles can be prevented.

With the reciprocating piston pump 30 fuel can be injected at more than 40 bar, preferably 60 bar into the combustion chamber 5, as a result of which the jet of fuel 16 is ejected from the injector nozzle 13 at an exit velocity of approx 15 to 35 m/second, In accordance with the invention a distinction is made between a primary jet of fuel 16a, extending between the injector nozzle 14 and the piston crown 8, and a reflected secondary jet of fuel 16b which is reflected from the piston crown 8 or the bowl 17 thereof back into the combustion chamber 5.

Since the bowl 17 is defined sharp-edged by the defining wall 19, the fuel spreading out at the bottom of the bowl 18 is decelerated and reflected back into the combustion chamber 5 with little energy. The secondary jet of fuel 16b thus forms a cloud of fuel 70 standing above the center region of the piston crown 8. In the cloud of fuel 70 the fuel is dispersed atomized and forms a homogenous region having a specific fuel/air ratio.

Due to the high ejection velocity a considerable proportion of the fuel in the primary jet of fuel 16a is atomized and blends with the air in the combustion chamber 5. The major proportion of the ejected fuel forms the cone-shaped core region of the jet of fuel 16a which as such is too rich for ignition by the spark plug 12. Since the primary jet of fuel 16a consists of fuel droplets differing in size the fuel/air ratio in the primary jet of fuel 16a is constant only in minute partial regions. These partial regions, each of which has a different fuel/air ratio, flow through the spark gap between the ignition electrodes 21 of the spark plug 12 at high velocity during the burning duration of an ignition spark. The burning duration of an ignition spark is usually 1 to 2 ms. This is sufficient for several partial regions having differing fuel/air ratios to pass through the spark gap, whereby the relatively lean partial regions are ignited by the ignition sparks so that both the cloud of fuel 70 generated by the secondary jet of fuel 16b and the fuel from the primary jet of fuel 16a atomized in the combustion chamber 5 burn. The burning duration of the ignition spark is extended preferably to 4 to 5 ms so that reliable ignition can be assured even during unfavorable operating conditions.

At low loads the internal combustion engine is operated as a full load in accordance with the invention without any throttling of the inducted air, or merely with slight throttling thereof, so that exhaust gases from the previous working stroke are totally swept from the combustion chamber, as a result of which a far greater amount of air than is necessary for generating the desired engine power always exists in the combustion chamber 5. In an extreme case the internal combustion engine may be configured without a butterfly or throttle valve. The output of the engine is set substantially by the amount of fuel injected each time.

This operation at low engine loads with the inducted air throttled only slightly, or not at all, in conjunction with a charge stratification by means of reflection from the piston crown 8 results in extremely good emission values simultaneously with precise power control of the internal combustion engine up to no-load running. On the other hand this arrangement detriments the maximum possible output of the internal combustion engine in no way whatsoever so that the usual outputs specific to the capacity concerned are generated, thus making it also possible to operate a two-stroke internal combustion engine highly effectively with charge stratification, necessitating only a single injection per working stroke. Due to the exhaust gases being totally swept out by the fresh air an ideal combustion of the fuel/air mixture is achieved in all load ranges so that the internal combustion engine features good smooth running properties in all load ranges.

Due to the configuration of the flanked portion 10 of the cylinder head 4 and the corresponding convex formed surface of the piston crown 8 which is arranged at top dead center slightly spaced away from the flanked portion 10 of the cylinder head 4, air is forced during the compression stroke from the edge portions of the cylinder 2 into the center portion via the bowl 17 (arrow 72) so that as a result of the swirling produced thereby intermingling of the air/fuel mixture is optimized.

The arrangement of the injector nozzle 13 and the dome or arch-shaped recess 9 are configured preferably so that neither the primary nor the secondary jet of fuel 16a, 16b comes into contact with the inner surface areas 6, 7 of the combustion chamber.

This first example embodiment permits operation of an internal combustion engine with stratified charging particularly at minimum loads since due to the bowl 17 being defined sharp edged the velocity of the reflected fuel is strongly decelerated, thus avoiding the spacious and homogenous distribution thereof in the combustion chamber 5. This permits reliable, speedy and complete combustion which is introduced very early following commencement of injection, due to the facilitated flammability of the high-energy primary jet of fuel at the ignition electrode.

In FIG. 2 a second example embodiment of an internal combustion engine is illustrated. In this example embodiment both the injector nozzle 14 and the spark plug 12 are arranged offset to one side of the vertical center line 15 of the cylinder 2 and remote from each other. In the piston region 8 a bowl 73 is in turn incorporated arranged in the region below the injector nozzle 14 for instance. The bowl 73 comprises an inclined bottom 74 sloping down in the direction of the spark plug 12 and climbing at the edge portion of the bowl 73 facing the spark plug 12 up to the convex surface of the piston crown 8 by a short, steep defining wall 75. The defining wall 75 is arranged approximately at right angles to the bottom of the bowl 74, the transition between the bottom of the bowl 74 and the defining wall 75 not being configured sharp-edged but rounded 76. An imaginary elongation oriented linearly upwards extends into the region of the ignition electrodes 21 of the spark plug 12.

When a jet of fuel 16 is injected into the combustion chamber 5 or bowl 73 it spreads over the bottom 74 of the bowl, part of the fuel being deflected non-decelerated by means of the defining wall 74 to the ignition electrodes 21 of the spark plug 12. Accordingly, the fuel splashes out of the bowl 73 laterally in the direction of the spark plug 12 and forms the secondary jet of fuel 16b. To better appreciate this splashing action of the secondary jet of fuel 16b it can be compared to the splashing of water from a spoon held under a running tap.

The fuel impinging the bowl 73 is thus redirected substantially non-decelerated into the combustion chamber 5 in the direction of the spark plug 12 as a secondary jet of fuel 16b. The kinetic energy of this secondary jet 16b is still sufficient at the ignition electrode for it to reliably burst into flame.

This second example embodiment permits operation of an internal combustion engine with stratified charging particularly at medium loads. Since, due to the longer path covered by the fuel, commencement of injection is able to occur significantly earlier than ignition, application and conditioning of greater amounts of fuel is possible. In the combustion chamber 5 at which the bowl 73 relative to the injector nozzle 13 is ideally configured for deflecting part of the fuel 16b with no delay, a substantial proportion of the fuel is atomized already in the primary jet 16a, mixed with air and reflected from the piston crown at diminished velocity. However, the time up to ignition is dimensioned so that a spacious and homogenous distribution in the combustion chamber does not occur, i.e. again producing charge stratification.

The inflammation of this amount of fuel, which in all is greater, continues to occur at a thermodynamically favorable point in time since merely commencement of injection and not the ignition point needs to be advanced. Reliable inflammation continues to be assured by the high-energy, deflected partial jet 16b in passing through the spark gap.

In FIGS. 3 and 4 a third preferred example embodiment of the invention is illustrated.

It comprises a piston crown 8 having a dual bowl 80. As viewed from above (FIG. 4) this dual bowl 80 is configured roughly circular, with a narrow deflecting bowl 81, which when viewed from above is roughly pill-shaped, and a decelerating reflector bowl 82 covering the remaining area of the deflecting bowl 80.

Cross-sectionally (FIG. 3) the deflecting bowl 81 is configured roughly vee-shaped with two side flanks 81a, b and a rounded bottom 81c. The decelerating reflector bowl 82 comprises a flat horizontal bowl bottom 83 which in adjoining the deflecting bowl 81 is defined by a defining wall 84 gradually ascending relative to the deflecting bowl 81 and a defining wall 85 oriented vertically to the bottom of the bowl 83 in the remaining edge portion of the decelerating reflector bowl 82.

As compared to the example embodiments cited above the domed or arched recess 9 in the cylinder head 4 is configured somewhat higher, the drilled passage 13 for receiving the injector nozzle 14 being incorporated at the zenith of the recess 9. The drilled passage 11 for the spark plug 12 is incorporated in the region of a side wall slightly deeper than in the previous example embodiments. Relative to the perpendicular axis 15 the drilled passage 13 of the injector nozzle 14 or the injector nozzle 14 is inclined so that the axis 15 perpendicular to the piston crown 8 and a longitudinal centerline of the injector nozzle 14 include an angle a which is in the range between 0° and 40°, preferably between 10° and 30°. Due to this inclination of the injector nozzle the ignition electrodes 21 of the spark plug 12 are disposed in the region of the envelope of the cone-shaped jet of fuel 16. For two-stroke engines this inclination of the injector nozzle 14 is preferably oriented so that the jet of fuel is directed in the direction of the fresh gas mixture in the cylinder or away from the outlet duct.

In this arrangement of the injector nozzle 14 and the spark plug 12 the deflecting bowl 81 is disposed below the injector nozzle 14 and the decelerating reflector bowl 82 below the ignition electrodes 21. The side flank 81b of the deflecting bowl 81 juxtaposing the decelerating reflector bowl 82 points by a linear elongation directed upwards to the ignition electrodes 21 of the spark plug 12.

This third example embodiment of the invention functions as follows:

A primary jet of fuel 16a is injected from the injector nozzle 14 cone-shaped in the direction of the dual bowl 80.

A first portion of the primary jet of fuel 16a atomizes on its way to the injector nozzle 14, to the piston crown 8 and intermingles directly with the air present in the combustion chamber.

The remaining fuel impinges the piston crown 8 at a steep angle $\gamma$ of e.g. 70°–90°. A second portion of the primary jet of fuel 16a is reflected from the decelerating reflector bowl 82 defined sharply edged. This cloud of fuel 70 is disposed substantially above the region of the decelerating reflector bowl 82. A third portion of the primary jet of fuel 16a is reflected non-decelerated by the deflecting bowl 81 into the combustion chamber 5. The reflected secondary jet of fuel 16b is oriented in the direction of the ignition electrodes 21 when the piston 3 is located in the region of top dead center and enriches the fuel/air mixture in the region of the ignition electrodes 21.

When the internal combustion engine in accordance with the third example embodiment is operated at low load a small amount of fuel is injected whilst the piston 3 is at top dead center. As the primary jet of fuel 16a the injected fuel comes into contact with the ignition electrodes or passes through the spark gap configured between the ignition electrodes 21, as a result of which the fuel can be ignited at the primary jet 16a, the short distance in time from the start of injection to ignition permitting combustion of minute amounts of fuel at low loads at a point in time which is favorable thermodynamically, prior to the cloud of fuel being distributed too spaciously.

By contrast, at high loads a cloud of fuel 77 formed in the region of the ignition electrodes 21 is ignited which is enriched substantially with fuel from the reflected secondary jet of fuel 16b.

At high loads and large fuel amounts injected a long time interval is thus available between start of injection and ignition. Accordingly, in this time interval the time of ignition can be selected according to purely thermodynamic considerations. Due to the configuration in accordance with the invention of the dual bowl 80, and depending on engine load and amount of fuel injected, the fuel in the combustion chamber is enriched differingly portionwise, without dual injection, whereby an ignitable fuel/air mixture always materializes in the region of the ignition electrodes 21. The time of ignition can be optimized solely by thermodynamic considerations both for minimum and medium loads preferably generated by the stratified charging method. Start of injection can be optimized for the desired engine load or for the inducted air needed without having to sacrifice reliable inflammation conditions at the ignition electrode 21 since at all times in question a cloud of fuel exists in this case with a rich mixture and adequate kinetic energy of the droplets. As a result of this and in combination with the fresh air intake being throttled not at all or only slightly ideal combustion conditions are achieved in the combustion chamber 5 enabling low emission for high load to be achieved. The internal combustion engine in accordance with the invention is operated preferably as two-stroke internal combustion engine.

What is claimed is:

1. A method of operating an internal combustion engine including at least one cylinder (2) in which a piston (3) is movably arranged, said cylinder (2) being closed off by a cylinder head (4) and a combustion chamber (5) being defined by an inner surface area (6) of said cylinder (2), an inner surface area (7) of said cylinder head (4) and a piston crown (8) of said piston (3), comprising the steps of, during a working stroke:

injecting fuel directly into said combustion chamber (5) so that said piston crown reflects the fuel away from the piston crown and back into the combustion chamber;

using in the engine a piston (3) having a piston crown (8) incorporating a bowl (17, 73, 80), said bowl (17, 73, 80) being arranged in the region in which the injected fuel impinges on the bottom (8) of said bowl; and impinging the fuel on said piston crown (8) at a steep angle γ, whereby the directly-injected fuel touches the bowl then reflects from the bowl in a direction contrary to the direction of injection.

2. The method as set forth in claim 1, further comprising:

impinging the fuel on said piston crown (8) at a steep angle γ of 70°–90°; and defining said bowl (17) sharp-edged by a defining wall (19) so that the injected fuel is reflected decelerated by said bowl (17) and atomized.

3. The method as set forth in claim 2, further comprising:

arranging a spark plug (12) with its ignition electrodes (21) in the region of an injected primary jet of fuel (16a) still to be reflected; and igniting a fuel/air mixture generated in said combustion chamber (5) at said primary jet of fuel (16a).

4. The method as set forth in claim 2, further comprising:

arranging an injector nozzle (14) and a spark plug (12);

providing said bowl (73) to comprise a sloping bottom (74) of the bowl which slopes down in the direction of said spark plug (12) and comprises a defining wall (75) pointing in the direction of said spark plug (12); and configuring the transition between said bowl bottom (74) and said defining wall (75) rounded so that fuel injected in said bowl (73) is reflected along said bowl bottom (74) and said defining wall (75) and non-decelerated back into aid combustion chamber (5) as a second jet of fuel (16).

5. The method as set forth in claim 1, further comprising arranging an injector nozzle (14) in said cylinder head (4).

6. The method as set forth in claim 1, further comprising:

arranging a spark plug (12) with its ignition electrodes (21) in the region of an injected primary jet of fuel (16a) still to be reflected; and igniting a fuel/air mixture generated in said combustion chamber (5) at said primary jet of fuel (16a).

7. The method as set forth in claim 1, further comprising:

arranging in said cylinder head (4) an injector nozzle (14) and a spark plug (12);

providing said bowl (73) to comprise a sloping bottom (74) of the bowl which slopes down in the direction of said spark plug (12) and comprises a defining wall (75) pointing in the direction of said spark plug (12); and configuring the transition between said bowl bottom (74) and said defining wall rounded so that fuel injected in said bowl (73) is reflected along said bowl bottom (74) and said defining wall (75) and non-decelerated back into said combustion chamber (5) as a secondary jet of fuel (16).

8. The method as set forth in claim 7 further comprising:

igniting said fuel/air mixture generated in said combustion chamber (5) at said secondary jet of fuel (16b).

9. The method as set forth in claim 1, further comprising:

using an injection device operating in accordance with the solid-state energy storage principle for injecting the fuel.

10. An internal combustion engine operating in accordance with the method of claim 1 and including at least one cylinder in which a piston (3) is movably arranged, said cylinder (2) being closed off by a cylinder head (4) and a combustion chamber (5) being defined by an inner surface area (6) of said cylinder (2), and inner surface area (7) of said cylinder head (4) and a piston crown (8) of said piston (3), comprising:

an injector nozzle (14) arranged in said cylinder head (4) operative to inject fuel directly into the combustion chamber at a steep angle onto said piston crown (8); and in said piston crown (8) a bowl (80) is configured which is arranged in the region in which the fuel impinges said piston crown (8), said bowl (80) comprising a deflecting portion and a decelerating reflector portion, said deflecting portion being configured so that fuel impinging said deflecting portion is reflected back into said combustion chamber (5) without substantial deceleration and said decelerating reflector portion being defined sharp-edged at least regionally so that the fuel impinging said decelerating reflector portion is reflected decelerated and atomized.

11. The internal combustion engine as set forth in claim 10, wherein said bowl (80) is configured as a dual bowl (80), said deflecting portion being formed by a deflecting bowl (81) and said decelerating reflector portion being formed by a decelerating reflector bowl (82).

12. The internal combustion engine as set forth in claim 11, wherein said dual bowl (80), as viewed from above, is configured roughly circular, with a narrow deflecting bowl (81), which when viewed from above is roughly pill-shaped, and said deaccelerating reflector bowl (82) covering the remaining area of said dual bowl (80).

13. The internal combustion engine as set forth in claim 11, wherein cross-sectionally said deflecting bowl (81) is configured roughly vee-shaped with two side flanks (81a, 81b) and a rounded bottom (81c).

14. The internal combustion engine as set forth in claim 11, wherein said decelerating reflector bowl (82) comprises a flat horizontal bowl bottom (83) which is adjoining said deflecting bowl (81) is defined by a defining wall (84) gradually ascending relative to said deflecting bowl (81) and a defining wall (85) oriented vertically to said bowl bottom (83) in the remaining edge portion of said decelerating reflector bowl (82).

15. The internal combustion engine as set forth in claim 10, wherein said cylinder head (4) comprises a domed or arched recess (9) at the zenith of which said injector nozzle (14) is arranged.

16. The internal combustion engine as set forth in claim 15, wherein a spark plug (12) is arranged in the region of said recess (9) below said injector nozzle (14) so that said spark plug (12) with its ignition electrodes (21) is arranged in both a non-reflected primary jet of fuel (16a) and in a jet of fuel (16b) reflected from said deflecting bowl (81).

17. The internal combustion engine as set forth in claim 15, wherein a longitudinal centerline of said injector nozzle (14) with an axis (15) perpendicular to said piston crown (8) includes an angle a which is in the range between 0° and 40°.

18. The internal combustion engine as set forth in claim 15, wherein said injector nozzle (14) is configured so that the fuel is ejected in the form of a cone-shaped jet of fuel (16).

19. The internal combustion engine as set forth in claim 11, wherein a side flank (81b) of said deflecting bowl (81) juxtaposing said decelerating reflector bowl (82) points by a linear elongation directed upwards to ignition electrodes (21) of a spark plug (12) arranged in the cylinder head.

20. The internal combustion engine as set forth in claim 10, wherein for injecting the fuel an injection device operating according to the energy storage principle is provided.

21. The internal combustion engine as set forth in claim 12, wherein:
   cross-sectionally said deflecting bowl (81) is configured roughly V-shaped with two side flanks (81a, 81b) and a rounded bottom (81c).

22. The internal combustion engine as set forth in claim 21, wherein:
   said decelerating reflector bowl (82) comprises a flat horizontal bowl bottom (83) which in adjoining said deflecting bowl (81) is defined by a defining wall (83) gradually ascending relative to said deflecting bowl (81), and by a defining wall (85) oriented vertically to said bowl bottom (83) in the remaining edge portion of said decelerating reflector bowl (82).

23. The internal combustion engine as set forth in claim 22, wherein:
   said cylinder head (4) comprises a domed or arched recess (9) at the zenith of which said injector nozzle (14) is arranged.

24. The internal combustion engine as set forth in claim 23, wherein:
   a spark plug (12) is arranged in the region of said recess (9) below said injector nozzle (14) so that said spark plug (12) with its ignition electrodes (21) is arranged in both a non-reflected primary jet of fuel (16a) and in a jet of fuel (16b) reflected from said deflecting bowl (81).

25. The internal combustion engine as set forth in claim 24, wherein
   a longitudinal centerline of said injector nozzle (14) with an axis (15) perpendicular to said piston crown (8) includes an angle a which is in the range between 0° and 40°.

26. The international combustion engine as set forth in claim 25, wherein
   said injector nozzle (14) is configured so that the fuel is ejected in the form of a cone-shaped jet of fuel (16).

27. The internal combustion engine as set forth in claim 26, wherein
   a side flank (81b) of said deflecting bowl (81) juxtaposing said decelerating reflector bowl (82) points by a linear elongation directed upwards to said ignition electrodes (21) of said spark plug (12).

28. The internal combustion engine as set forth in claim 19, wherein
   for injecting the fuel an injection device operating according to the energy storage principle is provided.

29. A method of operating an internal combustion engine including at least one cylinder (2) in which a piston (3) is movably arranged, said cylinder (2) being closed off by a cylinder head (4) and a combustion chamber (5) being defined by an inner surface area (6) of said cylinder (2), an inner surface area (7) of said cylinder head (4) and a piston crown (8) of said piston (3), comprising the steps of, during a working stroke:
   injecting fuel directly into said combustion chamber (5) so that said piston crown reflects the fuel;
   providing the engine with a piston having a piston crown (8) incorporating a bowl (17, 73, 80), arranged in the region in which the injected fuel impinges on the bottom (8) of said bowl;
   impinging the fuel on said piston crown (8) at a steep angle γ of 70°–90°;
   defining said bowl (17) sharp-edged by a defining wall (19) so that the injected fuel is reflected decelerated by said bowl (17) and atomized;
   arranging in said cylinder head (4) an injector nozzle (14) and a spark plug (12);
   providing said bowl (73) to comprise a sloping bottom (74) of the bowl which slopes down in the direction of said spark plug (12) and comprises a defining wall (75) pointing in the direction of said spark plug (12);
   configuring the transition between said bowl bottom (74) and said defining wall (75) rounded so that fuel injected in said bowl (73) is reflected along said bowl bottom (74) and said defining wall (75) and non-decelerated back into said combustion chamber (5) as a secondary jet of fuel (16); and
   igniting said fuel/air mixture generated in said combustion chamber (5) at second secondary jet of fuel (16b).

30. The method as set forth in claim 29, comprising:
   using an injection device operating in accordance with the solid-state energy storage principle for injecting the fuel.

* * * * *